No. 873,662. PATENTED DEC. 10, 1907.
G. P. COPP.
TROLLEY HEAD.
APPLICATION FILED MAR. 12, 1906.
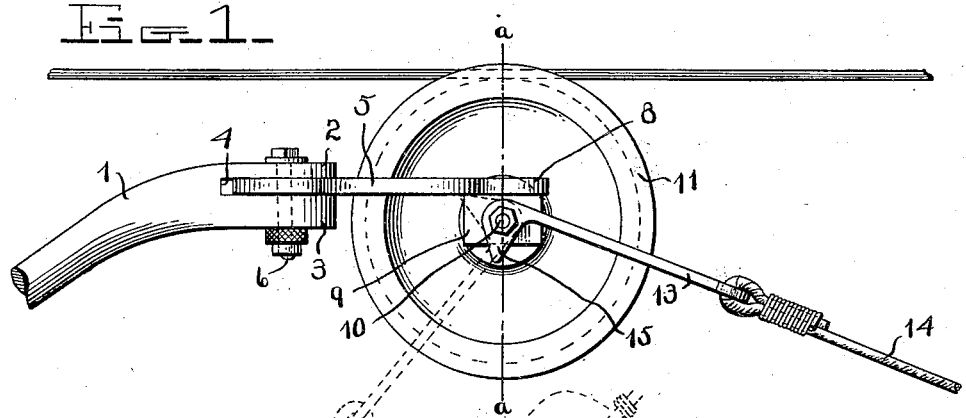
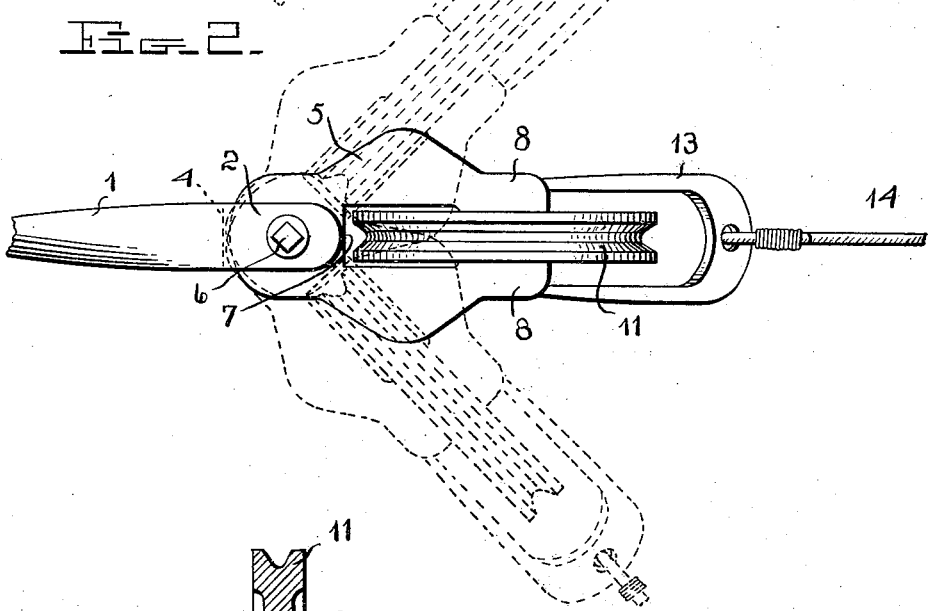
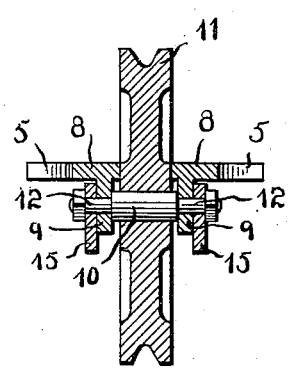
Witnesses
L. B. James
C. H. Giesbauer
Inventor
Gardner P. Copp
by H. B. Willson & Co.
Attorneys

UNITED STATES PATENT OFFICE.

GARDNER P. COPP, OF LOS ANGELES, CALIFORNIA, ASSIGNOR OF ONE-HALF TO ALLIN L. RHODES, OF LOS ANGELES, CALIFORNIA.

TROLLEY-HEAD.

No. 873,662.                    Specification of Letters Patent.                    Patented Dec. 10, 1907.

Application filed March 12, 1906. Serial No. 305,615.

To all whom it may concern:

Be it known that I, GARDNER P. COPP, a citizen of the United States, residing at Los Angeles, in the county of Los Angeles and State of California, have invented certain new and useful Improvements in Trolley-Heads; and I do declare the following to be a full, clear, and exact description of the invention, such as will enable others skilled in the art to which it appertains to make and use the same.

My invention is an improved trolley head, in which the trolley wheel is mounted in a trolley head which is pivotally connected to the upper end of the trolley pole, so that the trolley head may turn angularly when the car is on a curve to keep the trolley wheel, under all conditions, in a vertical position and substantially parallel with the trolley wire, and thereby prevent the trolley wheel from becoming disengaged from the trolley wire, my invention consisting in the construction, combination and arrangement of devices hereinafter described and claimed.

In the accompanying drawings,—Figure 1 is an elevation of the upper portion of a trolley pole provided with my improved trolley head, also showing the trolley wheel and the link yoke; Fig. 2 is a top plan view of the same; Fig. 3 is a transverse sectional view, taken on the plane indicated by the line a—a of Fig. 1.

In accordance with my invention, the trolley pole 1 is bifurcated at its upper end to provide the upper and lower arms 2, 3, and the slot 4 between said arms, the said slot being at such an angle with reference to the pole as to lie in a horizontal plane when the pole is elevated and the trolley wheel is engaged with the trolley wire. The width of the said arms 2, 3, is such that the upper and lower sides of the slot 4 form bearing surfaces of considerable width for the front end of the trolley head 5, said trolley head being pivotally connected at its front end to the pole by the pivot 6, which passes through an opening in the front portion of the trolley head and also through openings in the upper and lower arms 2, 3, of the trolley pole, the said pivot being here shown as a bolt. It may be otherwise constructed within the scope of my invention. The rear portion of the trolley head is bifurcated, as at 7, to provide a pair of rearwardly-extending arms 8. Said arms are provided at their rear ends on their under sides with bearings 9 for the axle 10 of the trolley wheel 11. The said arms bear snugly against opposite sides of the trolley wheel and owing to their breadth extend laterally therefrom. Their central portions are broadened to form outwardly-extending members, so that the trolley head constitutes an efficient finder which greatly assists in the engagement of the trolley wheel with the trolley wire. In the use of this device as a trolley finder, the broadened arms 8, when the trolley wheel is raised, so that the wheel passes close to without engaging the trolley wire, will, one of them engage the trolley wire and thus indicate that the wheel is very near the wires. Then, by slightly turning the trolley head in the required direction, and slightly lowering the wheel, the latter may be readily disposed to engage the wire when the wheel is next moved upwardly. The arms 8 operate tentatively to assist in the placing of the trolley wheel under the wire.

It will be observed by reference to Fig. 1, that the trolley head lies in a horizontal plane when the trolley pole is raised, and the trolley wheel is in engagement with the trolley wire, so that the trolley wheel is maintained in a vertical position while the trolley head, and hence the trolley wheel also, are enabled to swing laterally beyond either side of the trolley pole, when the car is on a curve, and hence the wheel is kept at all times substantially parallel with the trolley wire, irrespective of the angular position of the wheel and trolley head with reference to the trolley pole; hence the wheel is prevented from inclining or tilting when passing around a curve, and being kept under all conditions substantially parallel with the trolley wire, is prevented from becoming casually disengaged from the trolley wire.

The axle 10 is here shown as having reduced end portions 12. It may be otherwise constructed within the scope of my invention, and I do not desire to limit myself in this particular.

A yoke link 13 is provided, which is substantially U-shape, and is made of suitable metal, so that its arms may be sprung apart to the required extent to cause the openings in the front ends thereof to be engaged with the ends of the axle 10, and so that when the arms of the yoke link are thus engaged with and pivoted to the axle, they will bear against the outer sides of the bearings 9 of the trolley head 5. The arms of the trolley head, as will be observed by reference to Fig. 3, project outwardly beyond and overhang the bearings 9 and the ends of the axle 10 and the upper arms of the yoke link, to prevent the same from striking the trolley wire in the event that the trolley wheel should jump therefrom. The usual rope 14 is attached to the rear end of the yoke link to enable the conductor to detach the trolley wheel from or apply the same to the trolley wire, and to also reverse the pole at the ends of the track. This yoke link being pivotally connected to the trolley head by means of the axle, may lie in the required position. To prevent it from being turned too far forwardly, and bearing against the pole when the latter is erect and the trolley wheel is disengaged from the trolley wire it is provided at the front ends of its arms with stops 15, which extend at an appropriate angle from said arms and are adapted to engage the lower side of the trolley head to limit the movement of said yoke link.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined by the appended claims.

Having thus described my invention, what I claim as new, and desire to secure by Letters-Patent, is,—

1. In combination with a trolley pole, a trolley head pivotally connected thereto, extended rearwardly therefrom and bifurcated to form relatively laterally-broadened arms, said arms having bearings extending downwardly therefrom and overhung thereby, and a trolley wheel having its axle journaled in the said bearings and the ends of said axle also overhung by said arms, the latter also bearing closely against opposite sides of said wheel and coacting therewith to form a trolley finder.

2. In combination with a trolley pole, a trolley head pivotally connected thereto, extended rearwardly therefrom and bifurcated to form relatively laterally-broadened arms, said arms having bearings extending downwardly therefrom and overhung thereby, a trolley wheel having its axle journaled in the said bearings and the ends of said axle also overhung by said arms, the latter also bearing closely against opposite sides of said wheel and coacting therewith to form a trolley finder, and a V-shaped yoke link having its arms pivotally mounted on the ends of said axle and overhung at such pivotal points by said arms.

In testimony whereof I have hereunto set my hand in presence of two subscribing witnesses.

GARDNER P. COPP.

Witnesses:
J. W. GARNER,
E. P. BUNYEA.